(12) United States Patent
Konev et al.

(10) Patent No.: US 7,940,262 B2
(45) Date of Patent: May 10, 2011

(54) UNIFICATION AND PART HIDING IN THREE DIMENSIONAL GEOMETRIC DATA

(75) Inventors: Max Konev, Auckland (NZ); Mark Shafer, Auckland (NZ); Jed Fisher, Auckland (NZ)

(73) Assignee: Right Hemisphere Limited, Auckland (NZ)

( * ) Notice: Subject to any disclaimer, the term of this patent is extended or adjusted under 35 U.S.C. 154(b) by 902 days.

(21) Appl. No.: 11/763,585

(22) Filed: Jun. 15, 2007

(65) Prior Publication Data
US 2007/0291029 A1 Dec. 20, 2007

Related U.S. Application Data

(60) Provisional application No. 60/804,917, filed on Jun. 15, 2006.

(51) Int. Cl.
*G06T 15/00* (2011.01)
(52) U.S. Cl. ......... 345/419; 345/421; 345/422; 345/428

(58) Field of Classification Search ................. 345/419, 345/421, 422, 428
See application file for complete search history.

(56) References Cited

U.S. PATENT DOCUMENTS

| 6,593,929 B2 * | 7/2003 | Van Hook et al. ............ 345/501 |
| 6,717,576 B1 * | 4/2004 | Duluk et al. .................. 345/419 |
| 6,825,839 B2 | 11/2004 | Huang et al. |
| 2005/0116950 A1 | 6/2005 | Hoppe |

OTHER PUBLICATIONS

Policarpo, Fabio, and Francisco Fonseca. 2005. "Deffered Shading Tutorial." Available online at: (www710.univ-lyon1.fr/.../Deferred_Shading_Tutorial_SBGAMES2005.pdf.).

* cited by examiner

*Primary Examiner* — Phu Nguyen
(74) *Attorney, Agent, or Firm* — Vierra Magen Marcus & DeNiro LLP

(57) ABSTRACT

Technology is disclosed for improving the rendering of a three-dimensional (3D) object. In one aspect, the technology applies multi-scale visibility patches and adjacency heuristics to restore proper face and normals orientation at a per-object and per-polygon level; and target where best to apply ray-casting metrics to refine visibility determination.

18 Claims, 8 Drawing Sheets

UNIFICATION AND PART HIDING IN THREE DIMENSIONAL GEOMETRIC DATA

CLAIM OF PRIORITY

This application claims the benefit under 35 U.S.C. §120 of U.S. Provisional Patent Application No. 60/804,917, entitled "GEOMETRY REPAIR AND SIMPLIFICATION PROCESS", filed Jun. 15, 2006, and U.S. patent application Ser. No. 11/672,437, filed Feb. 7, 2007, entitled "THREE DIMENSIONAL GEOMETRIC DATA CORRECTION."

Each of said aforementioned applications is hereby specifically incorporated by reference.

BACKGROUND

Computer aided design (CAD) tools have become standard in many industries. Such tools are used in designing everything from buildings to micro-machines. Generally, designs are created in two dimensional drawings which might include various individual piece drawings as well as assembly and view drawings.

It is often useful when working with design drawings to view three dimensional representations of the objects in the drawings. Three dimensional (3D) visualization of objects is useful in a variety of contexts. For example, CAD designs can be converted to 3D representations to allow designers a better understanding of the element being designed.

Typically, when a CAD model is subjected to 3D visualization, the CAD model includes a significant amount of data that is not relevant for the view. Such data includes engineering details that create a performance barrier for real-time 3D visualization due to the rendering cost of redundant unseen features. Industry-standard algorithms for hidden feature removal, such as ray-casting, cannot be directly applied to the majority of CAD-produced models. This is due to geometry defects prevalent in CAD files (incorrectly oriented faces and normals, surface gaps and disjointed surfaces) coupled with the requirement for both speed and accuracy in real-time visualization.

Another issue in 3D visualization are errors in the proper orientation of CAD geometry. The true direction a 3D surface faces is represented by its normal. Normals are a fundamental component in 3D graphics—they form the basis of rendering, back-face removal, lighting and shading equations, and collision detection. The tesselation process in CAD/modeling tools often leads to the inversion of many surface normals in the 3D model. As a result, visualization is of unacceptable quality until these normals are corrected—a process termed, normal unification.

It is difficult, on the basis of a single face, to determine whether or not it has an inverted normal. Two connected triangles from a surface mesh may have oppositely directed normals because they form a sharp edge or because one of the two of the faces of the triangles has an inverted normal. It is difficult to distinguish these possibilities, and in the case of an inversion, which face is actually inverted.

It is possible to solve true orientation through ray-casting. This is, however, a computationally expensive process. Typically, models contain millions of triangles and it is computationally impractical to apply a brute-force approach using ray-casting for each triangle in the model.

SUMMARY

Technology is disclosed for improving the rendering of a three-dimensional (3D) object. In one aspect, the technology applies multi-scale visibility patches and adjacency heuristics to restore proper face and normals orientation at a per-object and per-polygon level; and target where best to apply ray-casting metrics to refine visibility determination.

In one embodiment, healing is used in a pre-processing step to efficiently extract adjacency information, used in the unifying and internal part removal algorithm, during the same operation as model repair. This synergistic combination of algorithm and process produces a result that is vastly superior (in terms of speed and quality) to the sum of the parts.

In one aspect, the technology includes a process for improving a rendering in a 3D scene of a Computer Aided Design (CAD) object, the view comprising a plurality of polygons visible from a variety of viewing angles. The process includes removing internal parts of the object defined in the scene, the internal parts being hidden in the plurality of viewing angles and unifying portions of the scene on a per object and per-polygon level.

In another aspect, a computer implemented process for creating 3D object view data is provided. The process includes accessing a 3D object data comprising a plurality of polygons having borders; removing internal parts of the object in the scene, the internal parts being hidden when rendering the 3D object in a plurality of viewing angles; and unifying portions of the object and applying evidence based heuristics to determine a normal direction for at least a subset of the unified portions.

DETAILED DESCRIPTION

Technology is disclosed in the form of a process that overcomes the limitations of conventional algorithms to remove unseen internal parts in 3D renderings, and corrects improper orientation surface patch normals. In one embodiment, the low-cost heuristic logic is applied, with low computational cost, to refine the application of costly, but more precise, visibility tests. The process uniquely applies multi-scale visibility patches and adjacency heuristics to (1) restore proper face and normals orientation at a per-object and per-polygon level; and (2) target where best to apply ray-casting metrics to refine visibility determination. In this way ray-casting is only required in a highly refined correctness check.

The heurisitics employed to target ray-casting along with the optimised ray-testing algorithm produces a highly efficient result.

Figure 1:
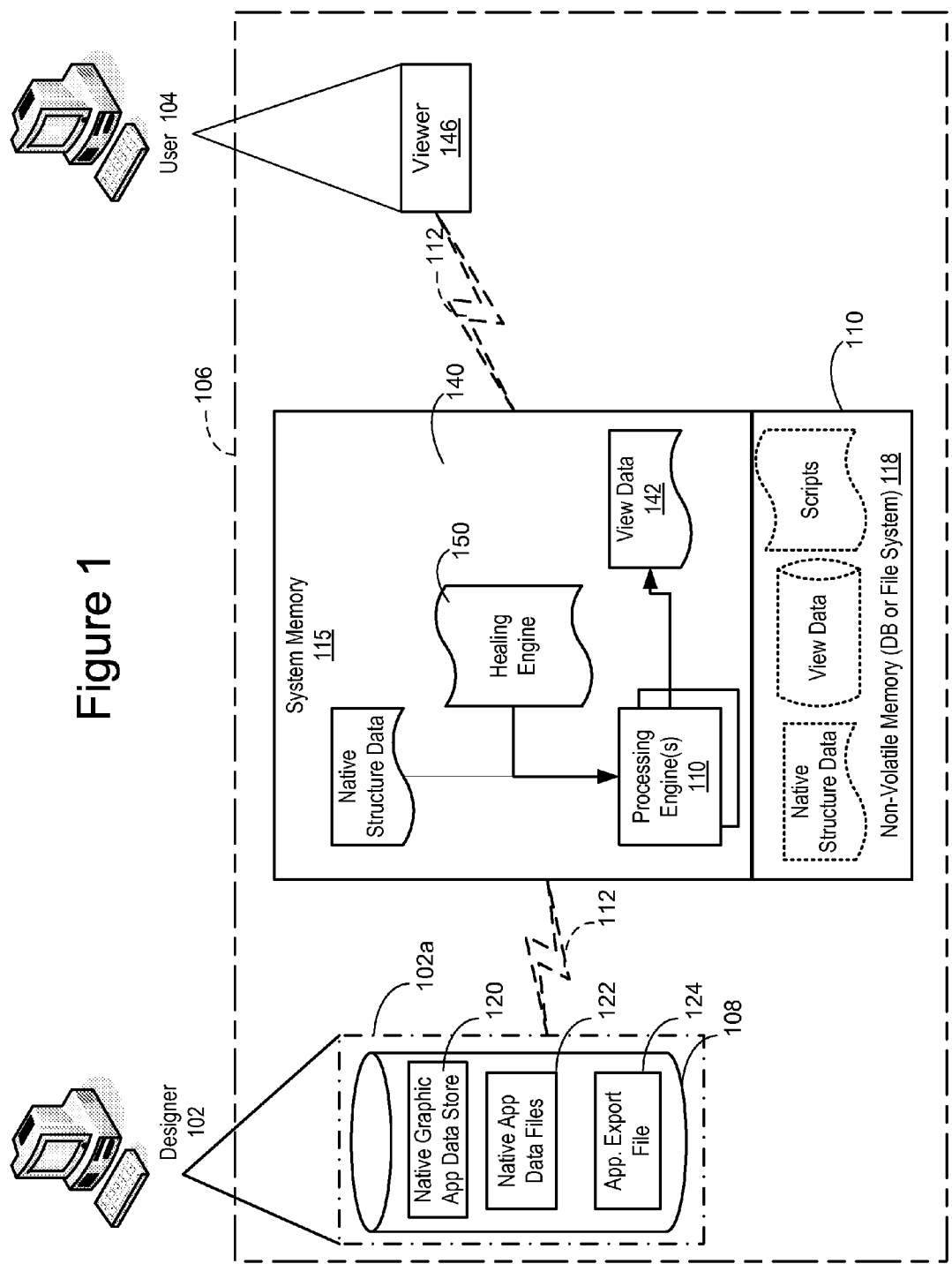
FIG. 1 is a block diagram of one embodiment of a system for implementing the present technology.

FIG. 1 illustrates a system for creating an optimized view data for a 3D object visualization. FIG. 1 is a block level diagram illustrating certain functional components and data structures utilized in the system suitable for implementing the present technology. In one embodiment, a processing device 106 may be employed as a server which stores native graphic application data, employs a healing engine to create modified object view data, and outputs the data to a viewer. The native data may be provided by a designer 102 using another processing device 102a, or the designer may create the native data on the processing device 106. Likewise, the viewer 146 may be provided on another network coupled processing device 104, or the viewer may operate on device 106. It should be understood that the components of FIG. 1 can be implemented on a single processing system or multiple processing systems.

In one embodiment, designer 102 will create an object design in a native graphic application which stores the design in native application data file or files 122 in data store 120 associated with the application. The native CAD data may be comprised of data from a number of different applications such as AutoCAD, Microstation, SolidWorks, etc., all of which have data in a native format which is accessible in a data store 120 directly by the application. The native data may be alternatively stored on a file system in data files or may be exported to alternative file formats 124 such as IGES (a commonly used widely read CAD solids format.)

Native application data files or the application data export file 124 may be provided to a processing system 106 to implement the healing technology discussed herein.

The processing system 106 may include non-volatile memory 118 and system memory 115. As will be generally understood by one of average skill, the components of the system operating in system memory may be stored in non-volatile memory 118 and loaded into system memory at run time as instructed by a system control (not shown). System memory 115 may include a healing engine performing the tasks described in FIGS. 1-11B to take native application data for the object (or application export file data) and provide healed visualization data. In one embodiment, the healing engine 150 comprises a series of instructions to instruct processing engines 110 to provide healed view data 142. The healed visualization data may be provided by a network 112 to viewer 146 for interpretation by user 104. It should be further understood that the user 104 and graphical designer 102 may be the same individual.

In one embodiment, the processing environment for a system 106 is a client server/network environment such that graphical designer 102 has a unique processing system including a storage unit 108 which houses native graphical data and user 104 has a unique processing system which includes a viewer 146 and communicates with a server 106, itself comprising a unique processing system, via a network communication mechanism 112. It will be readily understood that the network communication mechanism may comprise any combination of public or private networks, local networks and alike such as the Internet. Still further user 104 may have its own unique processing system which includes the viewer. Alternatively, the user 104, designer 102, data and viewer may all reside on and interact with a single processing system.

Figure 2:
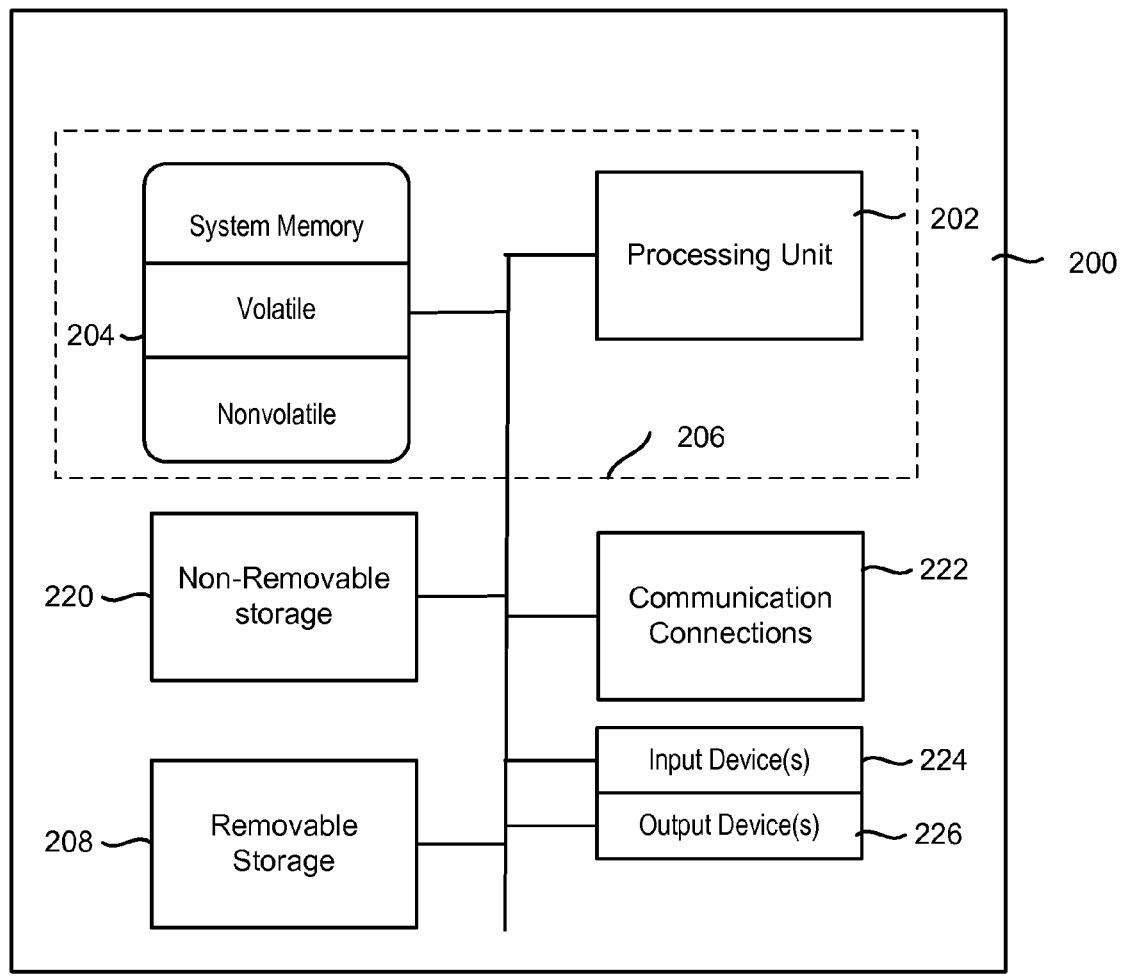
FIG. 2 is a block diagram of a processing system which may be utilized in accordance with the present technology.

With reference to FIG. 2, an exemplary processing system used in the system of FIG. 1 for implementing the technology includes at least one computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 220. Computer storage media includes volatile and nonvolatile, removable and non-removable media implemented in any method or technology for storage of information such as computer readable instructions, data structures, program modules or other data. Memory 204, removable storage 208 and non-removable storage 220 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 200. Any such computer storage media may be part of device 200.

Device 200 may also contain communication connection(s) 222 that allow the device to communicate with other devices. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Device 200 may also have input device(s) 224 such as keyboard, mouse, pen, voice input device, touch input device, etc. Output device(s) 226 such as a display, speakers, printer, etc. may also be included. All these devices are well know in the art and need not be discussed at length here.

Figure 3:
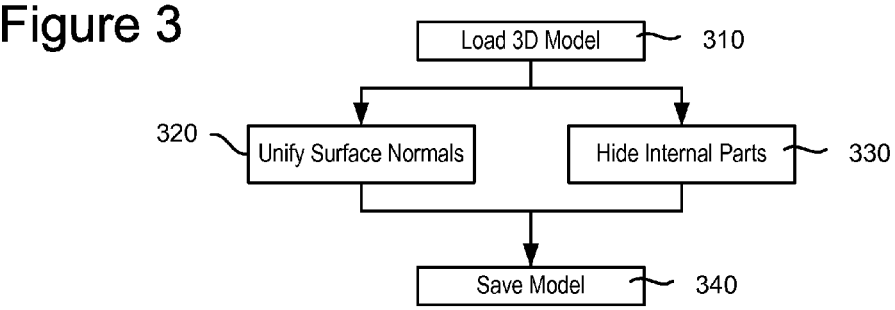
FIG. 3 is a flowchart representing a first method in accordance with the present technology.

FIG. 3 shows a method in accordance with the technology. At step 310, a 3D model of a scene is loaded into the processing system of, for example, FIG. 2. The model may be loaded by loading native data format as discussed above. A scene loaded at step 310 contains a hierarchal collection of 3D objects which are represented with polygonal meshes. Polygons are subdivided into triangles primitives for a mathematical efficiency and are connected to form a mesh. Such a mesh is termed "tessellated." The more triangles used to represent a surface, the more realistic the rendering, but more computation is required. Once loaded, the technology uses one or more of methods 320, 330 to correctly process a 3D rendering of the scene.

Methods 320 and 330 are complementary methods which may be used alone or in combination to provide a more efficient model at step 340. Method 320 is a process for unifying surface normals and is discussed below in FIGS. 6-9. In the method of step 320, proper face and normals orientation are restored on a per object and per polygon level. Method 330 comprises a process to hide internal parts which are not shown in a particular rendering and is discussed in further detail below in FIG. 5. Such hidden parts are generated by details which may not be rendered in a three dimensional scene view. In one embodiment, a user may select to use one or both methods 320 and 330. In various embodiments, the respective methods 320 and 330 will yield better results depending on particulars of the model geometry, i.e., a 3D shape and a topology (the way in which the mesh is connected together).

Figure 4A:
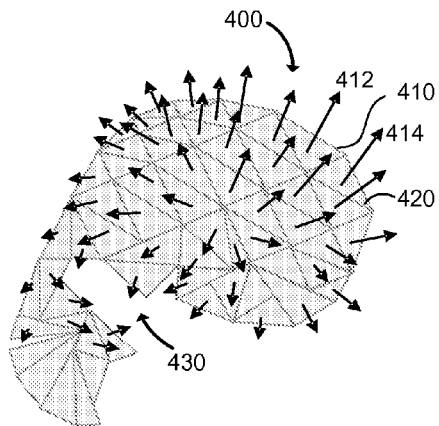
FIGS. 4a-4d represent a polygon object having a plurality of normals emanating from triangles making up the object.
Figure 4B:
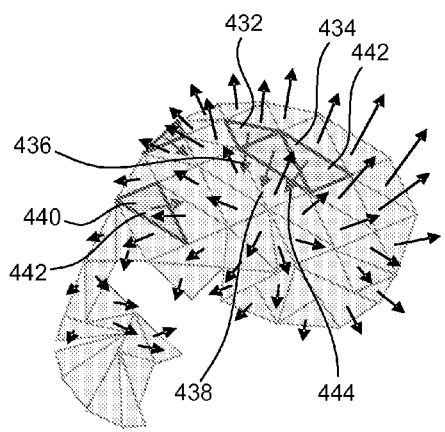
Figure 4C:
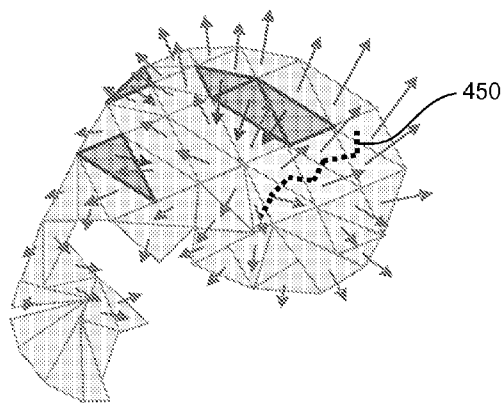
Figure 4D:
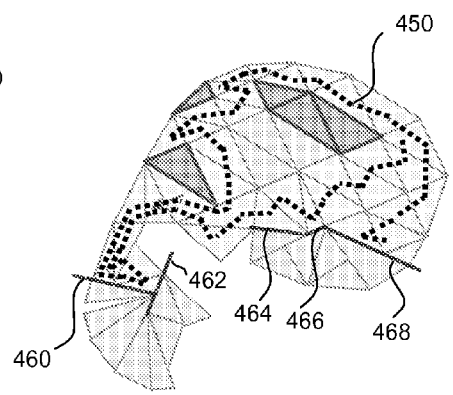

FIG. 4a shows a polygonal object 400 the series of interconnected triangle, for example triangles 410, 420, having a gap exists in the structure 400 as indicated by reference numeral 430. FIGS. 4b-4d will be referenced throughout the application in reference to the processes discussed herein.

Figure 5:
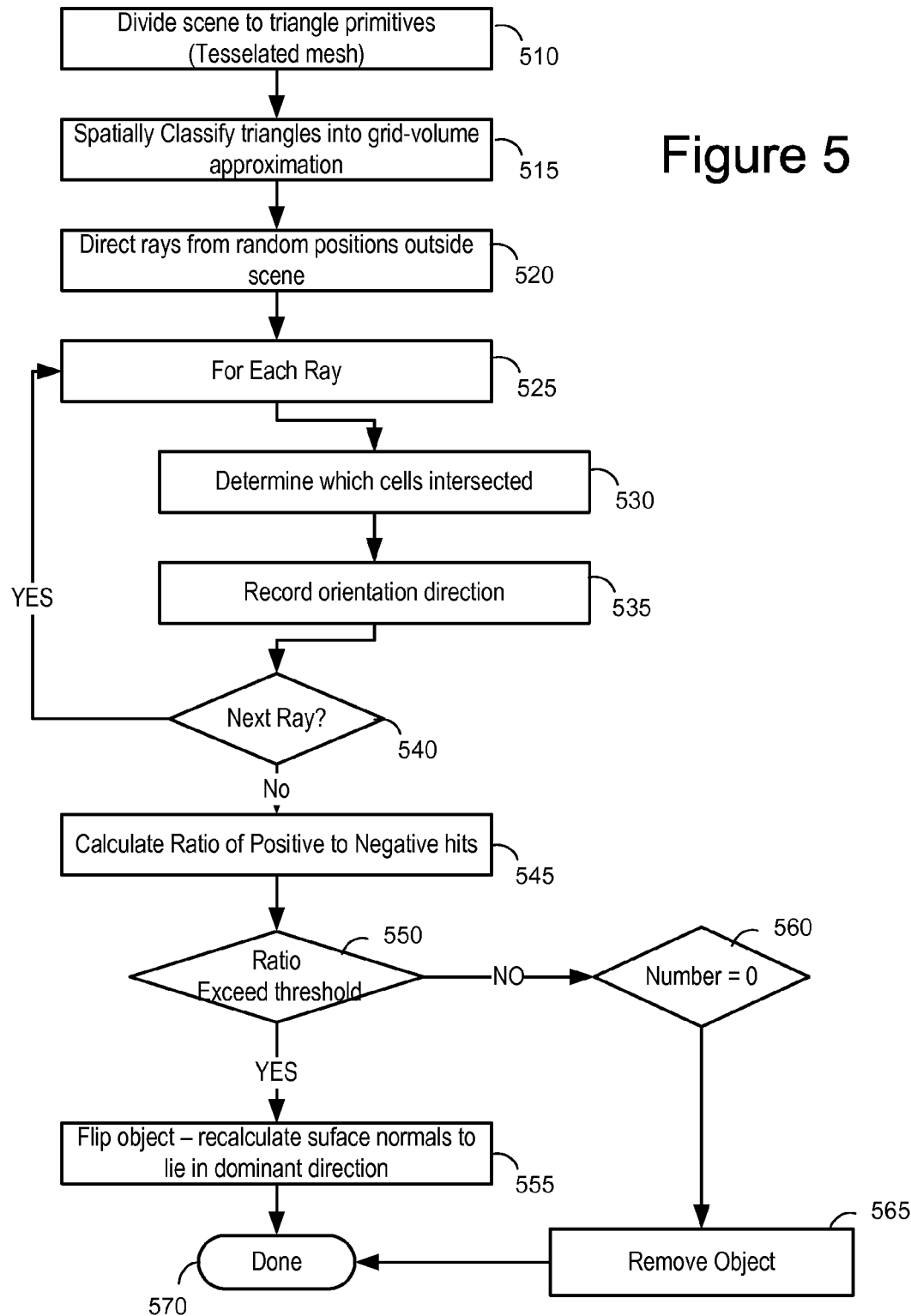
FIG. 5 is a flowchart illustrating the internal part hiding method referenced in FIG. 3.

FIG. 5 is a flow chart representing a process of hiding internal parts illustrated by the step 330. As noted above, CAD applications often produce scenes in which the normal orientation of component objects are inverted. The method of FIG. 5 gathers stochastically sampled evidence to rapidly determine the correct orientation and visibility of each object in the scene. At step 510, the scene is divided into triangle primitives. As noted above, polygons in a scene are reduced to mesh triangles in order to allow for easier computation. At step 515, the triangles that form meshes are spatially classified into a grid-volume of approximation of the scene. This approximation greatly reduces the number of triangles for which a ray intersection test needs to be applied. In the intersection test is relatively expensive in terms of computational resources. This is especially true in large models where millions of triangles are involved. By classifying groups of triangles into more coarse-grained group cells, it will therefore be only necessary to perform the ray intersection tests, described below, against the subset of triangles that occupy an intersected cell.

At step 520, a collection of rays are directed from random positions outside the scene. In step 520, the rays directed represent a sampling of potential viewing directions of the scene. The distribution and density of the sampling provides may be varied and represent a computation speed versus rendering accuracy trade-off. The rays are taken using uniform random sampling distribution.

The density of the sampling may be set as a user parameter which can be selected by a user performing the process. In one embodiment, this may be represented as a quality setting within the user's display. Increasing the quality setting increases the number of rays used. There is a linear relationship between the quality setting and the number of rays. The more rays that are used, the slower the algorithm will likely process, but the more likely that small model features will be intersected and rendered. Each sample ray is cast from a point on an imaginary spear that bounds the model through to its center. This bounding spear contains all objects in the scene. Thus, each ray represents a potential viewing direction from which the scene may be viewed.

At step 525, for each ray, the algorithm determines at step 530 which cells of the spatial mapping grid are intersected. At step 530, for a first cell containing triangular patches, the intersection tests are applied to each triangle that the ray hits. This is performed by testing the dot product between the ray and the triangle normal, and finding the smallest dot product available. This indicates the triangle closest to the origin of the ray. At step 535, the orientation direction of each intersecting triangle found at step 530 is recorded for the object to which it belongs. This determination is based on the size of the dot product calculated at step 530. A positive hit, meaning that the triangle is oriented towards the ray, is recorded as a +1. A negative hit, meaning that the triangle faces away from the ray, is recorded as a −1. Some triangles may produce a mathematically indeterminate result where, for example, a tall, slim, thin sliver of a triangle orientated with respect to the ray will be recorded as a zero. The number of positive and negative hits is accumulated per object.

At step 540, the calculations are repeated for each ray. When no additional rays are left to be calculated, at step 545 the ratio of positive to negative hits for triangles selected at step 530 is calculated over all sampling directions. The result of step 545 is a heuristic value for determining the true orientation of an object. If the ratio exceeds a threshold in step 550, then the object is flipped at step 555 such that all surface normals of the object are recalculated to lie in the dominant direction. If the ratio is less than the threshold in step 550 then the object normals are not changed. Next, if the number of hits of rays to the object is zero at step 560, then the object is removed from the scene at step 525. As a result of step 555, internal parts which are not visible from a sampled range of visual directions are hidden in the data.

Figure 6:
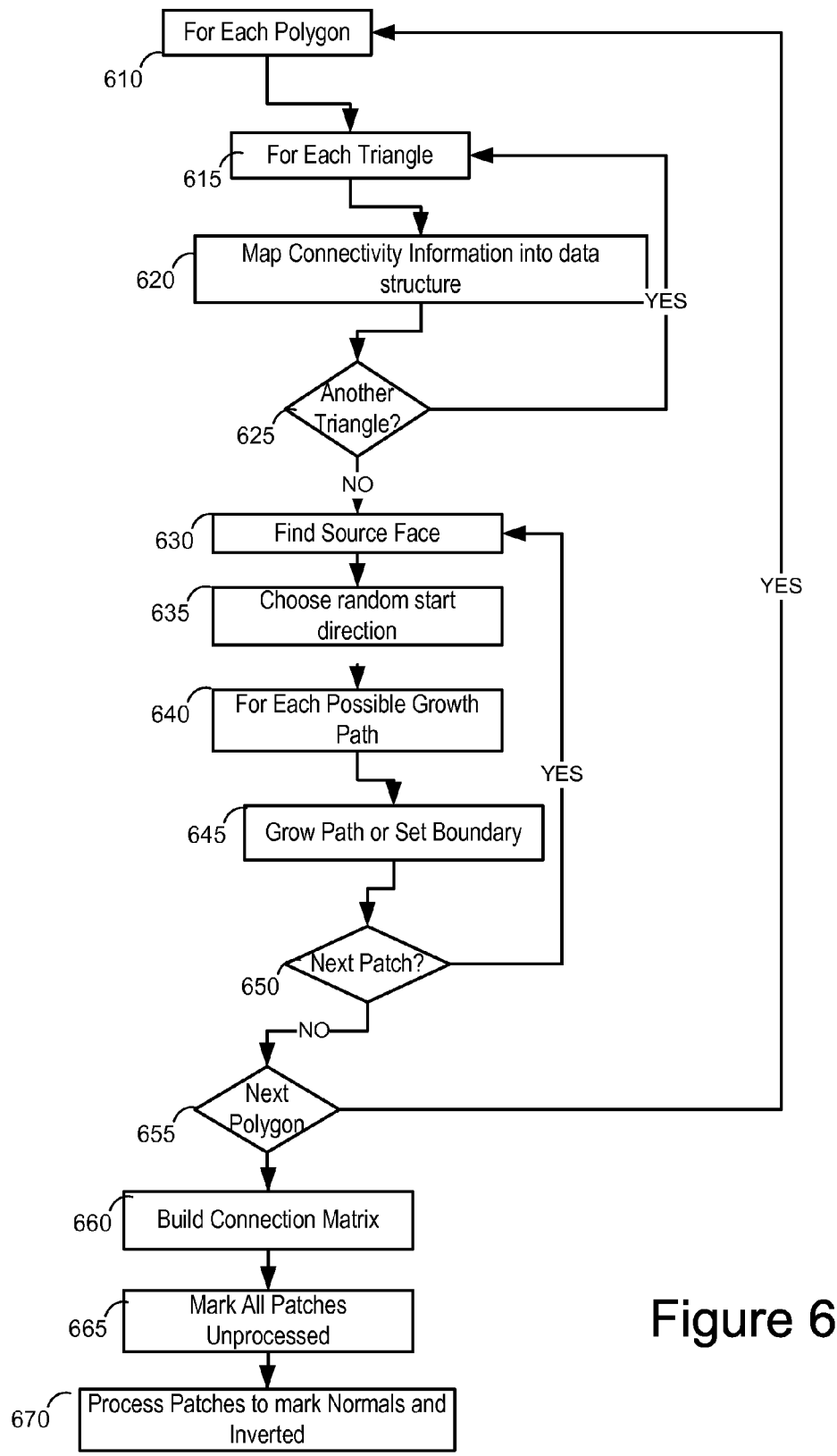
FIG. 6 is a flowchart illustrating the process for face unification and normals adjustment referenced in FIG. 3.

FIG. 6 represents an alternative approach to normals unification and takes advantage of the cohesiveness of connected surfaces patches and the fact that when considered locally, patches should not exhibit sudden changes of orientation. FIG. 6 is a more detailed description of the surface normals unification process 320. In accordance with this method, it is assumed that patches remain locally smooth. The exception to this occurs with surface boundaries and sharp discontinuities between adjacent polygons. In the process of FIG. 6, unification of each object surface is conducted at a polygon scale of assumed geometry. The process simplifies and corrects topology by growing cohesive searches patches (sets of adjacent triangle primitives) that transcend neighboring ray polygonial surfaces. The surface patch technique resolves small geometrical errors (such as gaps between faces that should be joined or sharply sloping faces in smooth surfaces) in favor of consistency over adjacent parts of the model.

Steps 610-655 represent the process of discovering patches within the polygon, while steps 660-670 determine the direction of patch normals.

As shown in FIG. 6, for each polygon 610, and for each triangle within the polygon 615, polygon connectivity information for the scene is computed. At step 620, for each triangle, those adjacent mesh triangles in the scene with shared vertices are mapped to an array. The connectivity data structure is built by iterating through a list of triangle faces in the scene. For each triangle face, a list of adjacent triangles which share a common edge is built and stored in the data structure. Hence, for each triangle at step 615, the connectivity information mapped at step 620 will include both the list of adjacent triangles which share a common edge and whether a patch is associated with the triangle.

Steps 630-650 describe the method of building patches. Patches are built by iterating through all the faces to find the next face which has not been associated with a patch representation. Such face is referred to as a source face. When no further triangles exist after step 625, a first source face is selected at step 630 and a random start path is selected at step 635. For each possible growth path at step 640, at step 645 the method will attempt to either grow a path to consolidate a current face or draw a boundary condition.

Figure 7:
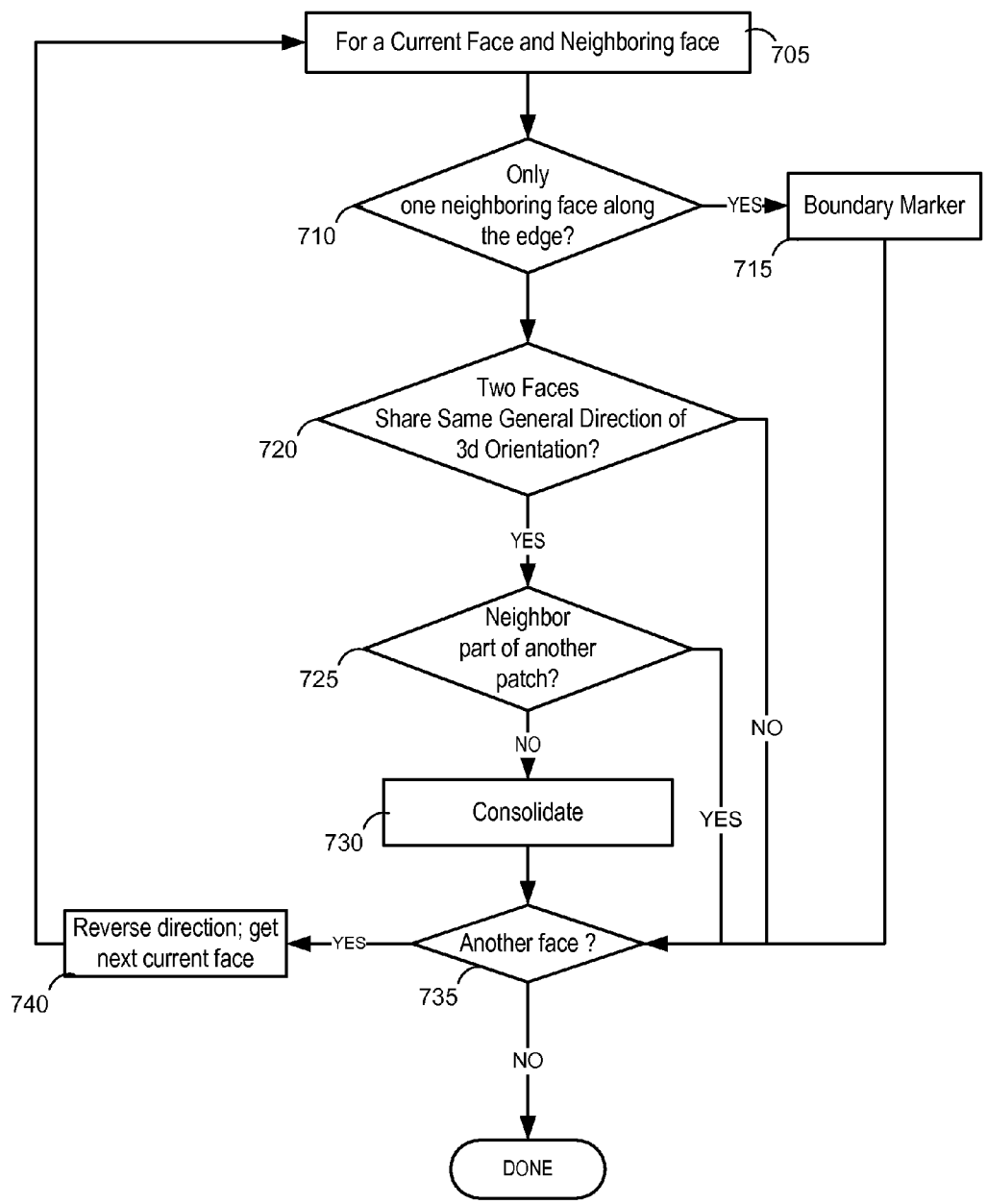
FIG. 7 is a flowchart illustrating patch growth in the process illustrated in FIG. 6.

The method of step 645 is detailed in FIG. 7. In the first recursion, the source face is set as a current face. In other recursions, other faces may be set as the current face. The method of FIG. 7 analyzes a current face and a neighboring face in a random direction. For a current selected face at step 705, at step 710 a first test checks whether there is only one neighboring face along the edge between the current face and a neighboring face (i.e. whether the faces form a manifold surface). If so, then at step 715, a boundary marker is placed between the two faces. A boundary marker signifies that the two faces either belong to different patches or that they have markedly different orientations. A sharp difference in orientation may signify that the surface normal is inverted (and obviously facing in the opposite direction as illustrated in FIG. 4b by normals 438, 436 and 444) or that it is a valid discontinuity. If there is more than one neighboring face along the edge at step 720, then at step 730 a determination will be made as whether the two faces share the same general direction of 3D orientation and at step 725 whether the neighboring face is not already part of another patch. If step 720 is true and step 725 false, the current face and the neighboring face will be consolidated at step 730. As illustrated in FIG. 4c, the surface patch will begin to grow as illustrated by dash line 450. If additional faces are present, at step 735, then at step 740, the algorithm will reverse in direction until a new valid direction of growth is found. At step 735, when all directions for path growth have been exhausted, a patch counter is incremented and a new patch is initiated by returning to step 630. The direction of travel around the mesh may make a difference to patch formation due to highly localized face orientation differences. In the case of a true discontinuity, the face will not be added to the patch when traversed in one direction, but may be if traversed in another direction.

If another path is available at step 650, the method returns to step 630 to find a source face for that path. When all potential paths have been exhausted and all potential polygons have been exhausted at step 655, a connection matrix will be built at step 660. Steps for building a connection matrix are disclosed in FIG. 8. The connection matrix provides a reference of the strength of the connectivity between any two neighboring patched with opposing normal directions.

Figure 8:
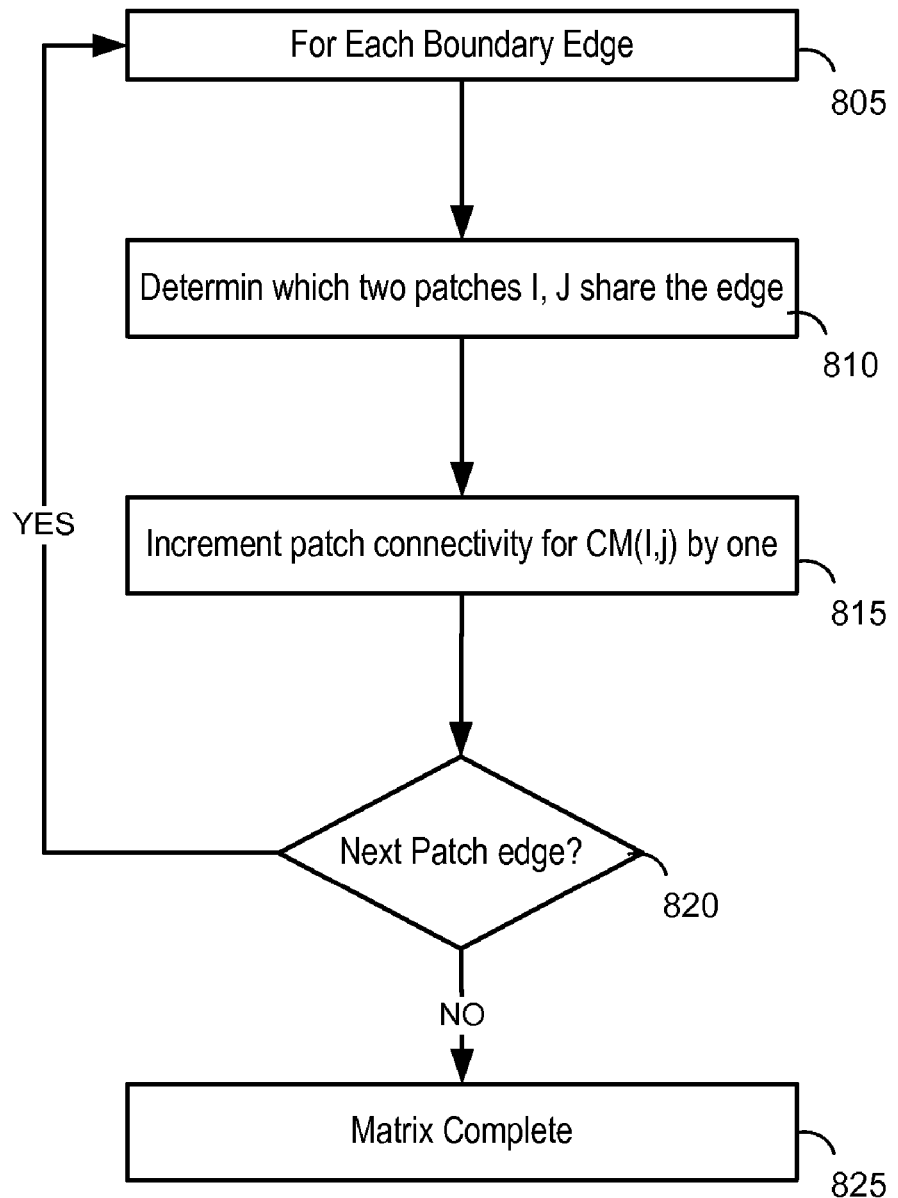
FIG. 8 is a flowchart illustrating creation of a connection matrix in the process of FIG. 6.

With reference to FIG. 8, the connection matrix is built by iterating through all the patch boundary edges. For each boundary edge 805, a determination is made of which two patches I, J share a particular edge at step 810. At step 815, the patch connectivity (CM) for two patches (I, J,) sharing an edge is incremented by 1 (CM(i,j)=CM(i,j)+1. At step 820, the next boundary edge is considered until all boundary edges are complete and the matrix is completed at step 825.

The process illustrated at step 670 (detailed in FIG. 8) allows for evidence based heuristics to be used to rapidly determine the most plausible direction of patch normals and a means of correcting orientation errors in the original model geometry. This stochastic process is bolstered by the targeted use of computationally expensive ray-casting in step 670 to anchor the true orientation of one of a set of interconnected patches or in situations where existing evidence from a connection matrix is not considered strong enough.

Once the connection matrix is built, all patches are marked as unprocessed in step 665, and the process of step 670 then processes all the patches to determine the correct direction of the normals in the patch. A completed surface patch is formed and boundary markers are shown in FIG. 4D. The process of step 670 is illustrated in FIG. 9.

Figure 9:
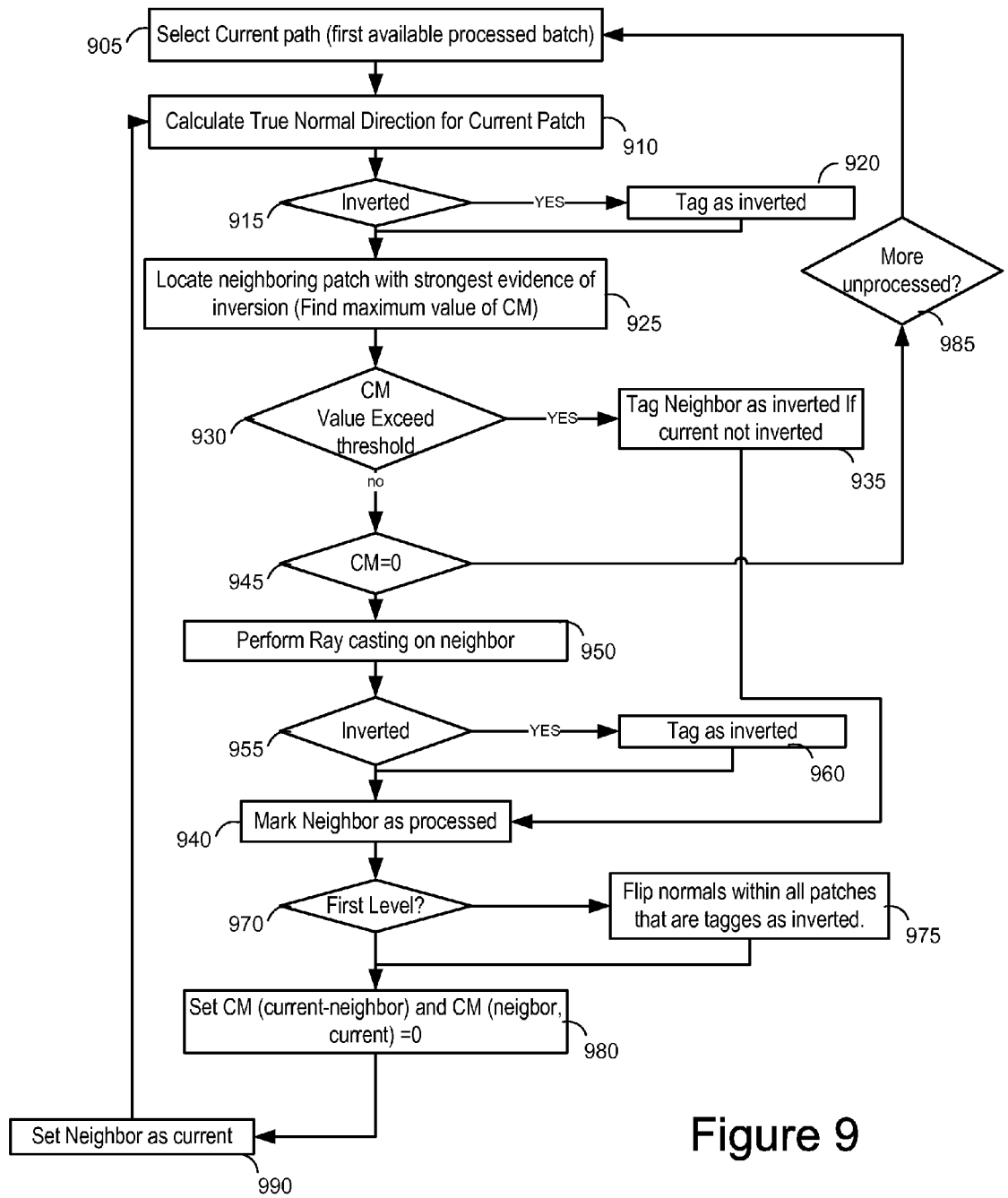
FIG. 9 is a flowchart illustrating normals correction and boundary marking in the process of FIG. 6.

FIG. 9 represents a process of marking normals and inverted normals within a patch. As noted above, at step 665 all patches are marked as unprocessed.

At step 905, the first available unprocessed patch is selected. This patch is defined as the "current" patch. At step 910, the true normal direction for the current patch is calculated through ray-casting. Ray-casting is a standard process for determining normals direction in 3D graphics. This patch orientation then forms the anchor for further processing of the method of FIG. 9. The result of ray-casting will determine whether or not this patch is inverted.

If the current patch is inverted at step 915, then the current patch is tagged as inverted at step 920. If the current patch is not inverted or after it is tagged, at step 925 the neighboring patch with the strongest evidence of inversion relative to the current patch is located in the connection matrix by finding the current maximum value of the connection matrix (CM) between the current patch and the neighbor patch. At step 930, determination is made as to whether the CM value is greater than a given threshold defined by the user. If the CM value exceeds the threshold, then at step 935 the neighbor patch is flagged as inverted if the current patch is not inverted. At step 940, the neighbor patch is marked as processed. If the current patch is inverted, the neighbor patch is not marked as inverted.

At step 945, if the CM value is zero, the method exits for the current recursion and at step 985, if there are additional unprocessed paths, the next available unprocessed path is obtained at step 905. If there are no more unprocessed paths, the method terminates.

If the CM value is not zero at step 945, at step 950 the CM value is below the threshold at step 930 and the CM heuristics are not reliable to determine the orientation of the current and neighbor patches. Hence, ray-casting is then performed on the neighbor patch to determine its true normal direction at step 950. If the neighbor is determined to be inverted at step 955, then it is tagged and inverted at step 960, and the neighbor is marked as processed at step 940.

Following step 940, if this is the first recursive process at step 970, then at step 975, all normals within all patches that are tagged as inverted are flipped. At step 980, the CM between the current patch and neighbor patch and the neighbor patch and current patch are set equal to zero.

At step 990, the neighbor patch is then set as the current patch and the method returns to step 910 to run through the recursion again. If there are any other non-processed patches left, it may be that unprocessed parts of the scene now consist of unconnected parts. It may, however, be that some of the surface patches have been flipped. As a result of this, new patch connections may now be possible. In this case, the process of FIG. 9 may be repeated once again from step 905 with the remaining patches.

Hence, patches represent a generally unified group of triangles with a proper orientation obtained by selectively using ray-casting only for those patches which are below a heuristically determined threshold. This saves computational time in rendering the scene.

It should be recognized that the methods of the present technology may be combined with other methods of data correction and rendering. In one alternative, the methods discussed herein may be combined with those disclosed in and U.S. patent application Ser. No. 11/672,437, filed Feb. 7, 2007, entitled "THREE DIMENSIONAL GEOMETRIC DATA CORRECTION", inventors, Max Konev, Mark Shafer and Jed Fisher, which is hereby specifically incorporated by reference herein.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for improving a rendering of a view in a three dimensional scene of a Computer Aided Design (CAD) object, the view comprising a plurality of polygons visible from a variety of viewing angles, comprising:

receiving the CAD object from a first processing device;
outputting healed visualization data based on the CAD object by:
removing internal parts of the object defined in the scene, the internal parts being hidden in the plurality of viewing angles; and
unifying portions of the scene on a per object and per polygon level by applying, for a first set of triangles, a heuristic to determine proper normal orientation for a triangle face and for a second set of triangles, selectively applying a ray-casting technique to determine proper normal orientation.

2. The computer implemented method of claim 1 wherein the step of removing internal parts comprises:
spatially classifying a tessellated mesh comprising a plurality of triangles representing at least one polygon;
directing rays from a subset of the plurality of viewing angles through the mesh;
determining which parts are intercepted; and
calculating a ratio of positive to negative hits and if the ratio is zero, removing a part from the object rendering.

3. The computer implemented method of claim 2 wherein the step of spatially classifying the tessellated mesh includes classifying the mesh into a grid-volume approximation and the step of determining comprises performing a ray-intersection test on each ray and at least one triangle.

4. The computer implemented method of claim 3 further including determining orientation direction of each intersecting triangle based on a sign of a dot-product determination of the ray-intersection test.

5. The computer implemented method of claim 4 wherein the step of unifying includes the steps of determining patches within the polygon based on connectivity between the triangles.

6. The computer implemented method of claim 5 further including the step of mapping connectivity information for each triangle into a data structure.

7. The computer implemented method of claim 6 further including determining for each triangle in each polygon a first possible growth path direction for a patch, testing the growth path, and setting a boundary or growing a patched in said direction based on said testing, thereby providing at least one patch.

8. The computer implemented method of claim 7 further including processing the patch to determine a correct direction of a normal for the patch.

9. The computer implemented method of claim 8 wherein the step of processing the patch includes:
finding a current patch and a neighbor patch, the neighbor patch having strongest evidence of inversion relative to other neighbor patches; and
determining whether the connectivity mapping information exceeds a threshold, and if so, marking the neighbor as inverted and if not, performing ray-casting on the neighbor.

10. The computer implemented method of claim 9 further including setting the neighbor patch as a current patch and repeating said steps of finding and determining.

11. A computer implemented process for creating three dimensional object view data, comprising:
receiving a CAD object from a first processing device;
outputting healed visualization data based on the CAD object by:
accessing three dimensional object data comprising a plurality of polygons having borders;
removing internal parts of the object in a scene, the internal parts being hidden when rendering the three dimensional object in a plurality of viewing angles; and
unifying portions of the object and applying evidence based heuristics to determine a normal direction for at least a subset of unified portions by applying, for a first set of triangles, a heuristic to determine proper normal orientation for a face and for a second set of triangles, applying a ray-casting technique to determine proper normal orientation.

12. The process of claim 11 wherein said step of applying ray-casting is performed for each unified portion having a normal direction not determined by applying evidence based heuristics.

13. The process of claim 11 wherein the step of unifying includes the steps of determining patches within the polygon based on connectivity between the triangles.

14. The process of claim 13 further including the step of mapping connectivity information for each triangle into a data structure.

15. The process of claim 14 further including determining for each triangle in each polygon a first possible growth path direction for a patch, testing the growth path, and setting a boundary or growing a patched in said direction based on said testing, thereby providing at least one patch.

16. The process of claim 15 further including processing the patch to determine a correct direction of a normal for the patch, said processing comprising:
finding a current patch and a neighbor patch with strongest evidence of inversion relative to other neighbor patches; and
determining whether the connectivity mapping information exceeds a threshold, and if so, marking the neighbor as inverted and if not, performing ray-casting on the neighbor.

17. The process of claim 11 wherein the step of removing internal parts comprises:
spatially classifying a tessellated mesh comprising a plurality of triangles representing at least one polygon;
directing rays from a subset of the plurality of viewing angles through the mesh;
determining which parts are intercepted; and
calculating a ratio of positive to negative hits and if the ratio is zero, removing the part from the object rendering.

18. A non-transitory computer readable medium having instructions stored thereon, the instructions causing a processing device to execute a method comprising:
accessing a three dimensional CAD object data comprising a plurality of polygons having borders; and
outputting healed visualization data based on the CAD object by:
removing internal parts of the object in a scene, the internal parts being hidden when rendering the three dimensional object in a plurality of viewing angles;
unifying portions of the object and applying evidence based heuristics to determine a normal direction for at least a first set of triangles to determine proper normal orientation for a triangle face and for a second set of triangles, selectively applying ray-casting to determine a normal direction a second subset of the triangles; and
rendering the three dimensional object using the healed visualization data.

* * * * *